(12) United States Patent
Bamba et al.

(10) Patent No.: US 9,317,529 B2
(45) Date of Patent: Apr. 19, 2016

(54) MEMORY-EFFICIENT SPATIAL HISTOGRAM CONSTRUCTION

(71) Applicant: Oracle International Corporation, Redwood Shores, CA (US)

(72) Inventors: Bhuvan Bamba, San Francisco, CA (US); Siva Ravada, Nashua, NH (US); Ying Hu, Nashua, NH (US); Richard J. Anderson, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 283 days.

(21) Appl. No.: 13/966,691

(22) Filed: Aug. 14, 2013

(65) Prior Publication Data
US 2015/0049944 A1 Feb. 19, 2015

(51) Int. Cl.
*G06K 9/00* (2006.01)
*G06F 17/30* (2006.01)

(52) U.S. Cl.
CPC .............................. *G06F 17/30241* (2013.01)

(58) Field of Classification Search
None
See application file for complete search history.

(56) References Cited

U.S. PATENT DOCUMENTS

| | | | |
|---|---|---|---|
| 5,359,724 A | 10/1994 | Earle | |
| 5,848,408 A | 12/1998 | Jakobsson | |
| 6,252,605 B1 * | 6/2001 | Beesley et al. | 345/441 |
| 6,317,750 B1 | 11/2001 | Tortolani et al. | |
| 6,385,604 B1 | 5/2002 | Bakalash et al. | |
| 6,397,195 B1 | 5/2002 | Pinard et al. | |
| 6,405,208 B1 | 6/2002 | Raghavan et al. | |
| 6,460,045 B1 | 10/2002 | Aboulnaga et al. | |
| 6,484,179 B1 | 11/2002 | Roccaforte | |
| 6,959,304 B1 | 10/2005 | Teig et al. | |
| 7,028,046 B2 | 4/2006 | Anjur et al. | |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,467,127 B1 | 12/2008 | Baccash et al. | |
| 7,617,312 B2 | 11/2009 | Tummalapalli | |
| 7,725,425 B2 | 5/2010 | Smartt | |
| 7,734,652 B2 | 6/2010 | Tamayo | |
| 7,769,733 B2 | 8/2010 | Chen et al. | |
| 7,774,303 B2 | 8/2010 | Shoup | |

(Continued)

OTHER PUBLICATIONS

Aoki, Paul M., "How to Avoid Building DataBlades That Know the Value of Everything and the Cost of Nothing", dated 1999, 12 pages.

(Continued)

*Primary Examiner* — Andrew Moyer
(74) *Attorney, Agent, or Firm* — Hickman Palermo Becker Bingham LLP

(57) ABSTRACT

Techniques are described for memory-efficient spatial histogram construction. A hierarchical spatial index has leaf nodes and non-leaf nodes, each leaf node representing a bounding region containing a spatial object, each non-leaf node representing a bounding region at least partially containing one or more spatial objects. A plurality of selected nodes is selected from the plurality of non-leaf nodes. The plurality of selected nodes includes an ancestor of each leaf node. For each particular node in the plurality of selected nodes, a weight is determined. The weight is based on the number of spatial objects contained within the bounding region of the particular node. A spatial partitioning of the plurality of selected nodes is determined. A spatial histogram is generated based on the spatial partitioning of the weights of the plurality of selected nodes.

20 Claims, 7 Drawing Sheets

(56) References Cited

U.S. PATENT DOCUMENTS

| | | |
|---|---|---|
| 7,797,320 B2 | 9/2010 | Thomsen |
| 8,001,112 B2 | 8/2011 | Dombroski et al. |
| 8,200,612 B2 | 6/2012 | Soylemez |
| 8,209,208 B2 | 6/2012 | Kearney et al. |
| 2005/0033741 A1 | 2/2005 | Dombroski et al. |
| 2006/0184519 A1 | 8/2006 | Smartt |
| 2011/0145244 A1* | 6/2011 | Kim et al. ............... 707/737 |
| 2013/0060547 A1 | 3/2013 | Beran et al. |

OTHER PUBLICATIONS

Acharya, S. et al., "Selectivity Estimation in Spatial Databases" *SIGMOD* 1999 (12 pages).

Beckmann N. et al., "The R*-tree: An Efficient and Robust Access Method for Points and Rectangles+" 1990 *ACM* (10 pages).

Bentley, J., "Multidimensional Binary Search Trees Used for Associative Searching" 1975 *ACM Student Award* (9 pages).

Eberhardt, H. et al., "Density Trees for Efficient Nonlinear State Estimation," *Proceedings of the 13$^{th}$ International Conference on Information Fusion*, Edinburgh, United Kingdom, Jul. 2010 (8 pages). (8 pages)—Need Year.

Guttman, A., "R-Trees: A Dynamic Index Structure for Spatial Searching " 1984 *ACM* (11 pages).

Samet, H. et al., "Storing a Collection of Polygons Using Quadtrees" *ACM Transactions on Graphics*, Jul. 3, 1985 (41 pages).

Wald, I. et al., On building fast kd-Trees for Ray Tracing, and on doing that in O (N log N) *IEEE Symposium on Interactive Ray Tracing* 2006 (9 pages).

* cited by examiner

MEMORY-EFFICIENT SPATIAL HISTOGRAM CONSTRUCTION

CROSS-REFERENCE TO RELATED APPLICATIONS; PRIORITY CLAIM

Technical Field

Embodiments relate generally to spatial data, and, more specifically, to techniques for memory-efficient spatial histogram construction.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A spatial object is an object that has defined shape, size, and position in a multidimensional space. Spatial objects may reside in multi-dimensional spaces having any number of dimensions. For example, points, lines, and polygons are common types of spatial objects in two-dimensional spaces, while cubes and spheres are common types of spatial objects in three-dimensional spaces. One common type of spatial data is geographic data, such as data used in geographic information systems ("GIS").

A spatial database system is a database system configured to provide functionality that has been optimized for storing and/or querying spatial objects. One common feature supported by spatial database systems is the ability to execute "spatial predicates." A spatial predicate is, in essence, a true/false query whose outcome is conditioned upon the spatial relationship between two extents. For example, using spatial predicates, a user might request that a spatial database system identify all roads within twenty miles of a geographic coordinate. The portion of the multidimensional space in which a spatial object exists is known as the "extent" of the spatial object.

It is often useful for a spatial database system to construct a "histogram" of the distribution of a set of spatial objects relative to defined partitions of a multidimensional space. The histogram includes a spatial object count associated with each partition. A histogram is useful for query optimization purposes. Depending on histogram statistics, the most efficient way to execute a query may differ. For example, a query may be executed by using an index on a table to access specific rows of the table (index access), or by scanning the entire table (full table scan) directly. The query optimizer generates an execution plan for a database query based on selectivity estimates for the various query predicates. The selectivity of a query predicate is the fraction of rows in a table that is chosen by the predicate. Selectivity estimates may be used to estimate the cost of a particular access method. Selectivity estimation in spatial databases is an important problem considering the impact it can have on the ability of the query optimizer to select the correct execution plan. Incorrect execution plans may adversely affect query execution and performance. A technique for constructing a histogram for a set of spatial objects involves recursively dividing a multi-dimensional space into partitions. The process repeats recursively on each newly created partition until some terminal condition is reached, such as the creation of a target number of partitions. Two of the different heuristics are "equi-area" and "equi-count." Both heuristics involve splitting a partition into "smaller partitions," such as left and right halves. The "equi-area" heuristic splits a partition into two or more "smaller partitions" of approximately equal area. The "equi-count" heuristic divides a partition into two or more "smaller partitions" having approximately equal numbers of spatial objects.

Unfortunately, when equi-area and equi-count heuristics are applied to data sets containing complex spatial objects with large spatial extents, low utility histograms with poor selectivity estimation can result. One problem may be the creation of very large partitions. Another problem resulting from the above heuristics may be the creation of buckets with too few data objects. Such issues may lead to inaccurate statistics, such as poor selectivity estimates. Furthermore, for very large data sets, spatial objects cannot be maintained in main memory for histogram construction purposes, leading to a significant increase in overhead, such as read and write operations to one or more storage devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
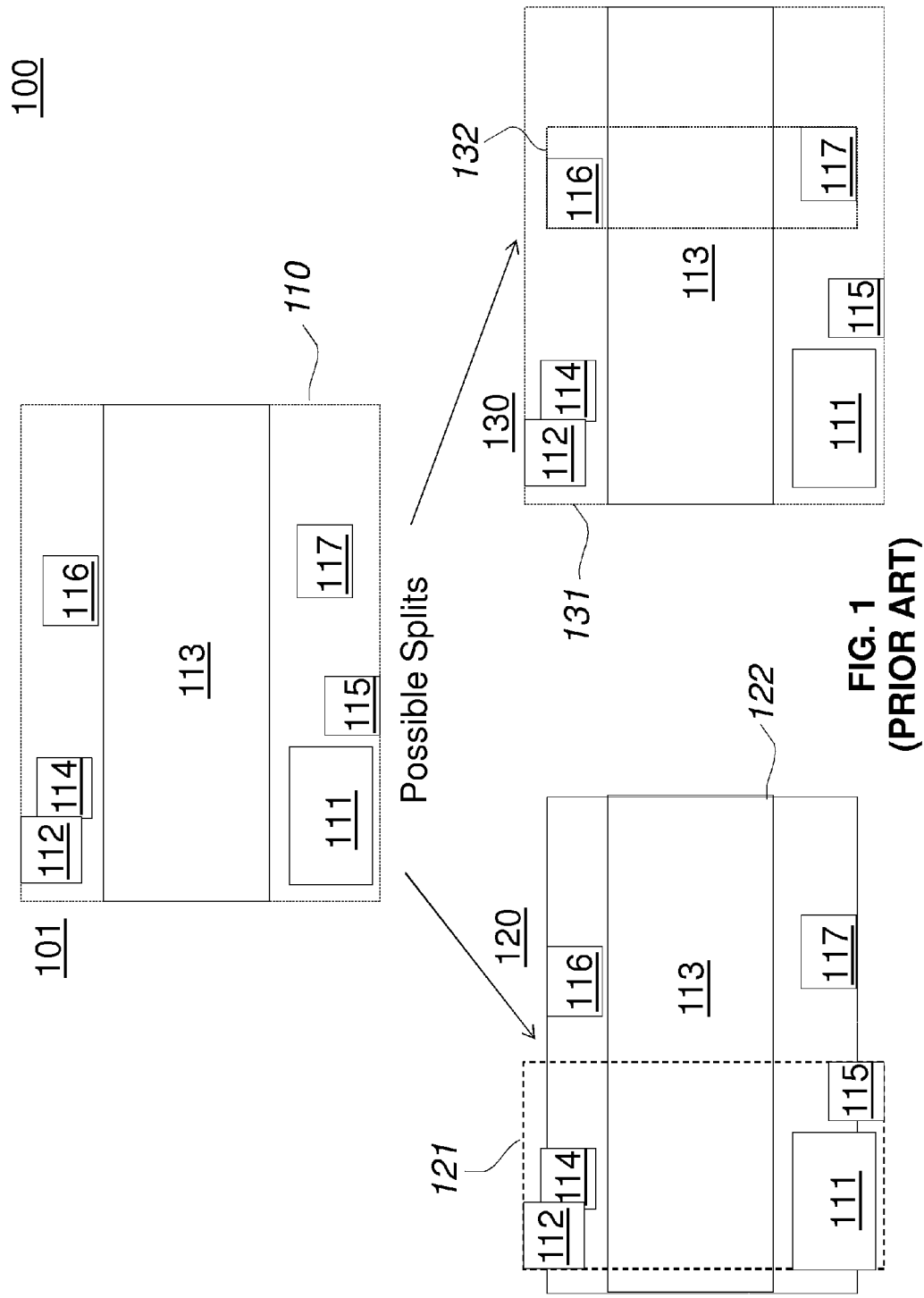
FIG. 1 is a block diagram that illustrates how large partitions can result from equi-area or equi-count techniques.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches, techniques, and mechanisms are disclosed for memory-efficient construction of histograms for spatial data. The spatial histogram, in turn, may be used to compute an estimated spatial predicate selectivity value. This may be used to generate an execution plan for a spatial query.

In a database, a hierarchical spatial index, such as an R-tree, is maintained for spatial objects. The hierarchical spatial index includes non-leaf nodes that represent a bounding region containing one or more spatial objects, where the leaf nodes represent individual spatial objects and/or an associated bounding region. The bounding region of a child node that descends from a non-leaf node is fully contained within the bounding region of its ancestor nodes. In one embodiment, the bounding region for each node is a minimum bounding region, such as a minimum bounding rectangle (MBR).

To generate the spatial histogram, a spatial partitioning of the multidimensional space containing the spatial objects is generated, and a count of the spatial objects in each partition is determined. When the spatial objects are indexed, the spatial partitioning may be generated based on a plurality of selected nodes selected from the non-leaf nodes of the hierarchical spatial index. The plurality of selected nodes may include an ancestor of each leaf node such that all the leaf nodes are represented in the plurality of selected nodes. The plurality of selected nodes may be selected based on a main memory limitation. For example, a depth level of the hierarchical spatial index may be determined such that the main memory limitation is satisfied. In one embodiment, fuzzy splitting techniques are utilized to generate the spatial partitioning, where a single spatial object and/or bounding region may belong to multiple partitions.

A weight is determined for each node in the plurality of selected nodes. The weight of a non-leaf node is based on the number of spatial objects contained within the bounding region of the non-leaf node. A spatial histogram is generated based on the spatial partitioning and the weights.

Spatial Object Representation

The portion of the multidimensional space in which a spatial object exists is known as the "extent" of the spatial object. A spatial object may be represented within its multidimensional space by specifying the boundary of the spatial object's extent in terms of a series of coordinates known as vertices. Each successive pair of vertices in the series is a vector that forms the edge of the object. In this manner, spatial objects of arbitrary complexity may be represented, from simple shapes (e.g. triangles and squares) to complex shapes (e.g. territorial borders and roads). Other manners of representation also exist, such as equations, bitmaps, and hybrid approaches. For convenience throughout this disclosure, a spatial object shall hereinafter be synonymous with its representation.

A spatial database system need not be exclusively devoted to spatial data. For example, relational database systems may be used to store both spatial data and non-spatial data. One way of supporting spatial data in a relational database system is to mark certain tables as storing spatial data. Spatial data may be stored in tables using any suitable form. For instance, each row of a table may be a different spatial object, having one or more columns whose values specify the extent of the spatial object. A variety of other techniques exist for storing spatial data, including without limitation other relational database techniques as well as techniques involving databases dedicated entirely to spatial data.

A bounding region containing the spatial object may be specified. The bounding region may be used to simplify calculations in a spatial database that do not require the exact spatial dimensions. For example, since it is computationally expensive to determine whether the extent of a spatial object is actually within a partition, histograms are often based on the distributions of simplified bounding regions for the spatial objects rather than the actual extents of those spatial objects.

Spatial database systems may be configured to generate spatial indexes. A variety of types of spatial indexes exists. One such spatial index is an R-tree, which hierarchically groups objects by bounding region. For two-dimensional spatial data, a minimum bounding rectangle may be used as the bounding region.

A minimum bounding rectangle (MBR) is a bounding region of one or more two-dimensional spatial objects. A minimum bounding rectangle represents the maximum extents of the spatial object/s, and may be represented by a minimum and maximum values for the x and y coordinates of a two-dimensional object in its two-dimensional coordinate system (e.g. min(x), max(x), min(y), max(y)). More generally, a minimum bounding region is a smallest size bounding region of a particular shape or structure that is capable of enclosing the extent of a spatial object. The use of bounding regions to approximate the extent of an object when constructing a histogram can reduce the amount of time necessary to construct a histogram while still producing estimated object counts of reasonable utility.

Spatial Histograms

A histogram may be used to estimate the selectivity of spatial queries against sets of spatial data, such as Database tables. For example, when deciding the most optimal query plan for executing a spatial query, a query optimizer often makes determinations that are conditioned upon how many spatial objects in a table are estimated to fall within a target area of a multiple dimensional space.

Heuristics such as equi-count and equi-area heuristics may be problematic when applied to data sets containing complex spatial objects with large spatial extents, leading to low utility histograms with poor selectivity estimation. One problem may be the creation of very large partitions. FIG. 1 is a block diagram 100 that illustrates how large partitions can result from equi-area or equi-count techniques. Initial partition 110, as illustrated by dashed lines in block 101, comprises objects 111-117, of which object 113 is significantly large, and in fact fills the entire width of partition 110. According to some equi-area and equi-count heuristics, the objects in initial partition 110 may be divided into two "sides," along a vertical line between objects 115 and 116. Depending on the heuristic—in particular depending on the "side" in which object 113 is placed—two different sets of partitions may result from such a split of partition 110. If object 113 is placed on the right "side," then as depicted in block 120, partitions 121 and 122 result, with object 113 residing in partition 122. If object 113 is placed on the left "side," then as depicted in block 130, partitions 131 and 132 result, with object 113 residing in partition 131. In either case, both partitions 122 and 131 are as large (or almost as large) as the original bucket. This is because the partition in which object 113 resides must be able to entirely enclose object 113. Moreover, it is impossible to further subdivide partitions 122 and 131 using such heuristics. This problem can be particularly significant if partition 110 contains many more items, as is likely to be the case in some embodiments.

Figure 2:
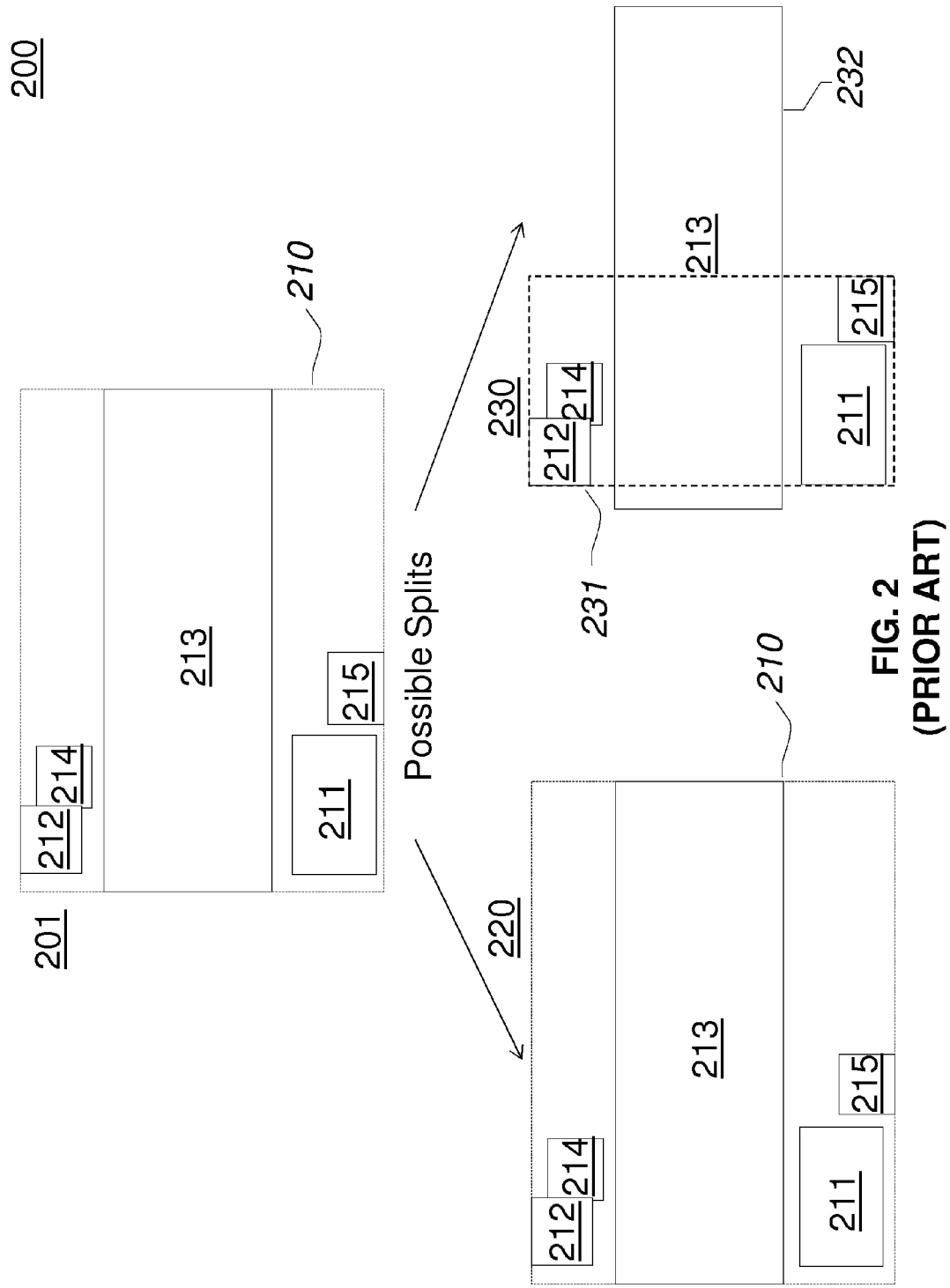
FIG. 2 is a block diagram that illustrates how low-count partitions can result from equi-area techniques.

Another problem resulting from the above heuristics may be the creation of buckets with too few data objects. FIG. 2 is a block diagram 200 that illustrates how low-count partitions can result from equi-area techniques. As illustrated in block 201, initial partition 210 comprises objects 211 to 215, of which object 213 is significantly large, and in fact fills the entire width of partition 210. Two different splits are possible according to some equi-area heuristics, depending on the "side" in which object 213 is placed. The bottom left block 220 shows that no split occurs if 213 is assigned to the left side, leaving only the original partition 210. In the other case, as illustrated in block 230, partitions 231 and 232 are created, with partition 231 comprising objects 211, 212, 214, and 215, and partition 232 comprising only object 213.

Another issue with the partitioning-based heuristics is that they need to store a spatial object representation for each object (such as its MBR) until the histogram construction process is completed. In some instances, histograms are useful to construct for spatial data tables with potentially billions of rows. In such a scenario, partitioning-based algorithms need to read/write data from/to the disk multiple times during the bucket splitting process as limited amount of memory is available for the histogram construction process. Such disk-based algorithms slow down the statistics collection process significantly.

Structural Overview

Figure 3:
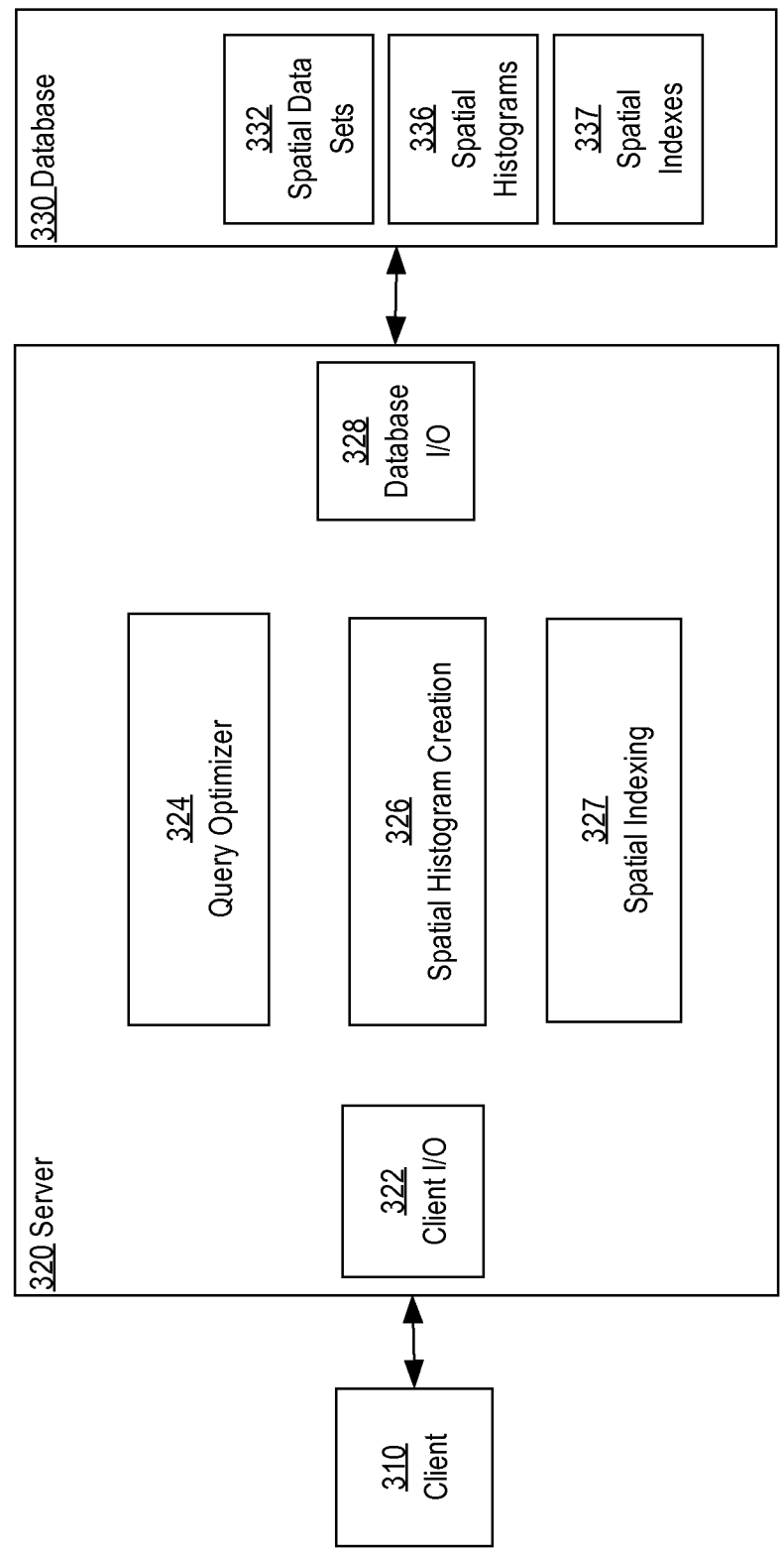
FIG. 3 is a block diagram that illustrates an example system in which the techniques described herein may be practiced.

FIG. 3 is a block diagram that illustrates an example system in which techniques for memory-efficient spatial histogram construction may be practiced.

System 300 comprises a client 310, server 320, and database 330. Depending on the embodiment, system 300 may include additional clients. For example, client 310 may be one of many clients configured to interact with server 320. Depending on the embodiment, system 300 may further include additional servers and/or databases. For example, server 320 may be part of a multi-node system, and database 330 may be one of many copies of a database. System 300 is but one example of a system in which the techniques described herein may be practiced. Other systems for practicing the techniques described herein may include fewer or additional components, in varying arrangements.

Client 310 may be any application or component that relies upon data from database 330. For example, client 310 may be a web application or other database application that issues database commands to server 320 to retrieve or manipulate data, including spatial data, from database 330. Client 310 may communicate with server 320, for example, over a network or by procedure calls. Client 310 may send requests to server 320 using any suitable protocol(s), including without limitation SQL, XQuery, Java, and so forth.

Server 320 comprises a client input/output ("I/O") component 322, a query optimizer 324, a spatial histogram creation component 326, a spatial indexing component 327, and a database I/O component 328. Though not depicted, server 320 may further include any of a variety of additional components. For example, server 320 may comprise any relational database component and/or logic. Server 320 may further or separately include additional components optimized to provide spatial database features, including without limitation, GIS components.

Client input/output ("I/O") component 322 receives requests from client 310 and sends responses to those requests once the responses have been formulated by execution of a query. Query optimizer 324 analyzes database requests, such as received from client 310, and generates an execution plan for the execution of the query, such as by any component of server 320. Query optimizer 324 may generate an execution plan using any of a variety of query optimization techniques. For example, query optimizer 324 may utilize one or more spatial histograms 336 to generate an execution plan for a query involving a spatial data set 332.

Server 320 is configured to generate spatial histograms, such as one or more spatial histograms 336, from spatial data sets, such as spatial data sets 332, in accordance with the techniques for memory-efficient spatial histogram construction described herein. In one embodiment, spatial histogram creation component 326 of server 320 generates a spatial histogram using a plurality of non-leaf nodes in a hierarchical spatial index generated by spatial indexing component 327. Since spatial histograms can be relatively expensive to compute, spatial histogram creation component 326 may be configured to generate spatial histograms on a periodic basis (such as when a significant number of changes have been performed on the underlying spatial dataset), asynchronously in relation to database requests, so that relatively updated spatial histograms 336 are available for query optimizer 324 when necessary. In some embodiments, spatial histogram creation component 326 creates spatial histograms 336 in response to triggers, such as database commands that update the data in spatial data sets, or explicit commands, such as a command from a database administrator to rebuild spatial indexes 337.

Server 320 is configured to generate and maintain a spatial index, such as spatial indexes 337, from spatial data sets, such as spatial data sets 332. In one embodiment, a spatial indexing component 327 of server 320 may compute spatial indexes 337 using indexing techniques. In one embodiment, spatial indexes 337 are hierarchical spatial indexes, such as R-trees. Spatial indexing component 327 may be configured to generate and maintain hierarchical spatial indexes to provide possibly faster access to spatial data or improve one or more statistical calculations and/or estimates performed by query optimizer 324, such as a selectivity value estimate. For example, spatial indexing component 327 may be configured to generate and maintain one or more R-trees based on a fanout factor and/or a fill factor. Like spatial histogram creation component 326, spatial indexing component 327 may be configured to generate or refresh spatial indexes 337 periodically, in response to triggers, and/or in response to specific commands.

Database 330 stores at least one or more spatial data sets 332, one or more spatial indexes 337, and one or more spatial histograms 336. Database 330 may likewise store any of a variety of additional components, such as additional metadata, non-spatial data sets, and so forth. Each spatial data set 332 is a set of related spatial data objects that exist within a common multidimensional space. Spatial data sets 332 may be stored in any suitable form, including as one or more object-relational tables. In an embodiment, each spatial data set 332 is stored as a separate set of one or more object-relational tables. A separate spatial histogram 336 and spatial index 337 may exist for each spatial data set 332, and/or some spatial histograms 336 and spatial indices 337 may span multiple spatial data sets 332.

Server 320 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually.

System 300 is but one example of a system in which the described techniques may be practiced. Other systems may include fewer or additional components, in potentially varying arrangements.

Hierarchical Spatial Index

A hierarchical spatial index is used to implement memory-efficient spatial histogram construction. The hierarchical spatial index includes nodes that represent a bounding region containing one or more spatial objects, where the leaf nodes represent individual spatial objects. A child node that descends from a non-leaf node is fully contained within the bounding region of its ancestor nodes. For very large spatial data sets, rather than generating a spatial histogram using each individual spatial object (represented by the leaf nodes), bounding regions represented by the non-leaf nodes of the hierarchical spatial index are used. The non-leaf nodes correspond to bounding regions containing one or more spatial objects. A weight is determined and/or estimated for the individual non-leaf nodes that are selected for spatial partitioning and/or histogram construction.

Figure 4:
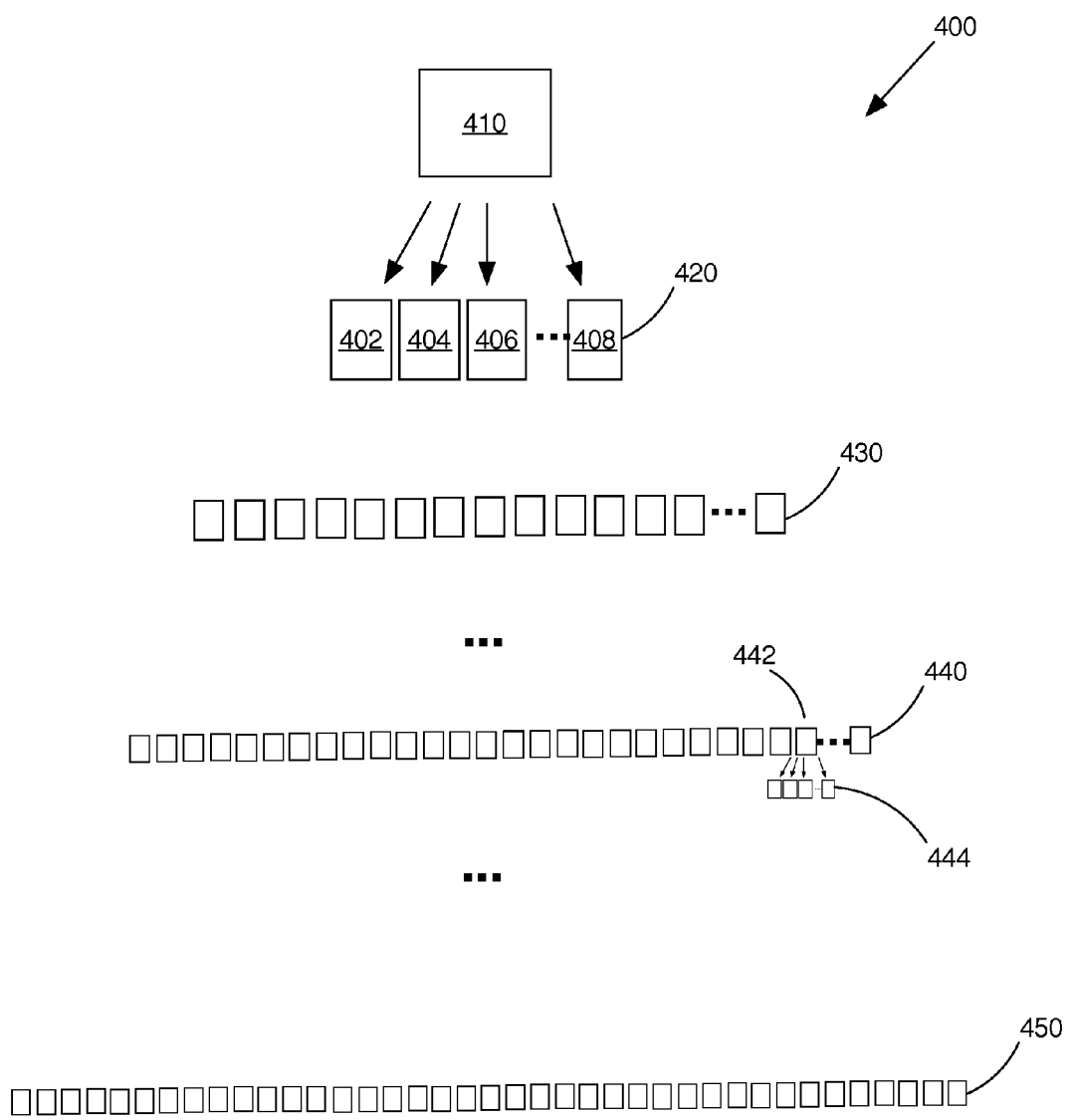
FIG. 4 is an example hierarchical spatial index in accordance with the techniques described herein.

FIG. 4 is an example hierarchical spatial index in accordance with the techniques described herein. Hierarchical spatial index 400 is configured to spatially index a plurality of spatial objects stored in a spatial database. In one embodiment, spatial index 400 is an R-tree. Each node of the R-tree corresponds to a bounding region containing one or more spatial objects. The bounding region may be an MBR, which may be represented by a minimum and maximum values for the x and y coordinates for the spatial objects contained therein.

Root node 410 is the root node of hierarchical spatial index 400. Root node 410 represents a bounding region containing all spatial objects indexed in hierarchical spatial index 400. In this section, the following notation is used to refer to hierarchical levels within hierarchical spatial index 400: leaf nodes 450 are at level 0; root node 410 is at level h. Level h−2 nodes 430, level h−i nodes 440, and a portion of level h−i−1 nodes 444 are also shown. Hierarchical spatial index 400 includes non-leaf nodes and leaf nodes 450.

Non-leaf nodes of hierarchical spatial index 400 represent bounding regions. A specific non-leaf node contains all bounding regions of nodes that descend from the specific non-leaf node. Thus, spatial objects corresponding to leaf nodes 450 that descend from the specific non-leaf node are contained within the bounding region represented by the specific non-leaf node.

Leaf nodes 450 correspond to the individual spatial objects that are indexed in hierarchical spatial index 400. Leaf nodes 450 may represent a bounding region of the corresponding individual spatial object, such as an MBR. When a specific spatial object is added, modified or removed from hierarchical spatial index 400, the bounding region parameters (e.g. the minimum and maximum values for the X and Y coordinates for a MBR) may be updated for one or more ancestor nodes of a leaf node 450 corresponding to the specific spatial object.

Hierarchical spatial index 400 has a height h. Level h−1 nodes 420 are child nodes of root node 410. Each individual level h−1 node 402-408 represents a bounding region contained within the bounding region represented by the parent node, i.e. root node 410. In one embodiment, a hierarchical spatial index 400 is constructed and/or maintained based on a fanout factor and a fill factor. The fanout factor refers to the maximum number of child nodes a non-leaf node may have. The fill factor refers to the existing number of child nodes for each non-leaf node. For example, the fill factor may refer to a target range that a spatial indexing component, such as spatial indexing component 327, attempts to maintain. The fill factor be consistent and/or may vary over the relevant multidimensional space and/or the height of non-leaf nodes within hierarchical spatial index 400. In one embodiment, a spatial indexing component, such as spatial indexing component 327, is configured to maintain a fill factor in a manner that optimizes one or more weight estimations for a node. The weight of a non-leaf node refers to the number of leaf nodes that descend from the non-leaf node. The weight of a particular non-leaf node corresponds to the number of spatial objects contained within the bounding region represented by the particular non-leaf node.

Node Selection

To generate a spatial histogram, a spatial partitioning of the multidimensional space containing the spatial objects is generated. Instead of generating the spatial partitioning based on each individual leaf node, the spatial partitioning is generated based on a plurality of selected nodes selected from the non-leaf nodes of the hierarchical spatial index.

In one or more memory-efficient histogram construction techniques, hierarchical spatial index 400 is used to determine a subset of weighted non-leaf nodes which can be maintained in main memory during the histogram construction process, according to specified limitations, thus eliminating the need to access secondary storage. The spatial histogram is generated using the subset of selected nodes. The selected nodes are a subset of weighted non-leaf nodes that are representative of the individual spatial objects corresponding to leaf nodes 450. In one embodiment, the selected nodes include exactly one ancestor node for each leaf node that is indexed. A spatial histogram creation component, such as spatial histogram creation component 326, may be configured to determine a spatial partitioning of the subset of weighted non-leaf nodes and generate a spatial histogram based on the spatial partitioning.

Figure 7:
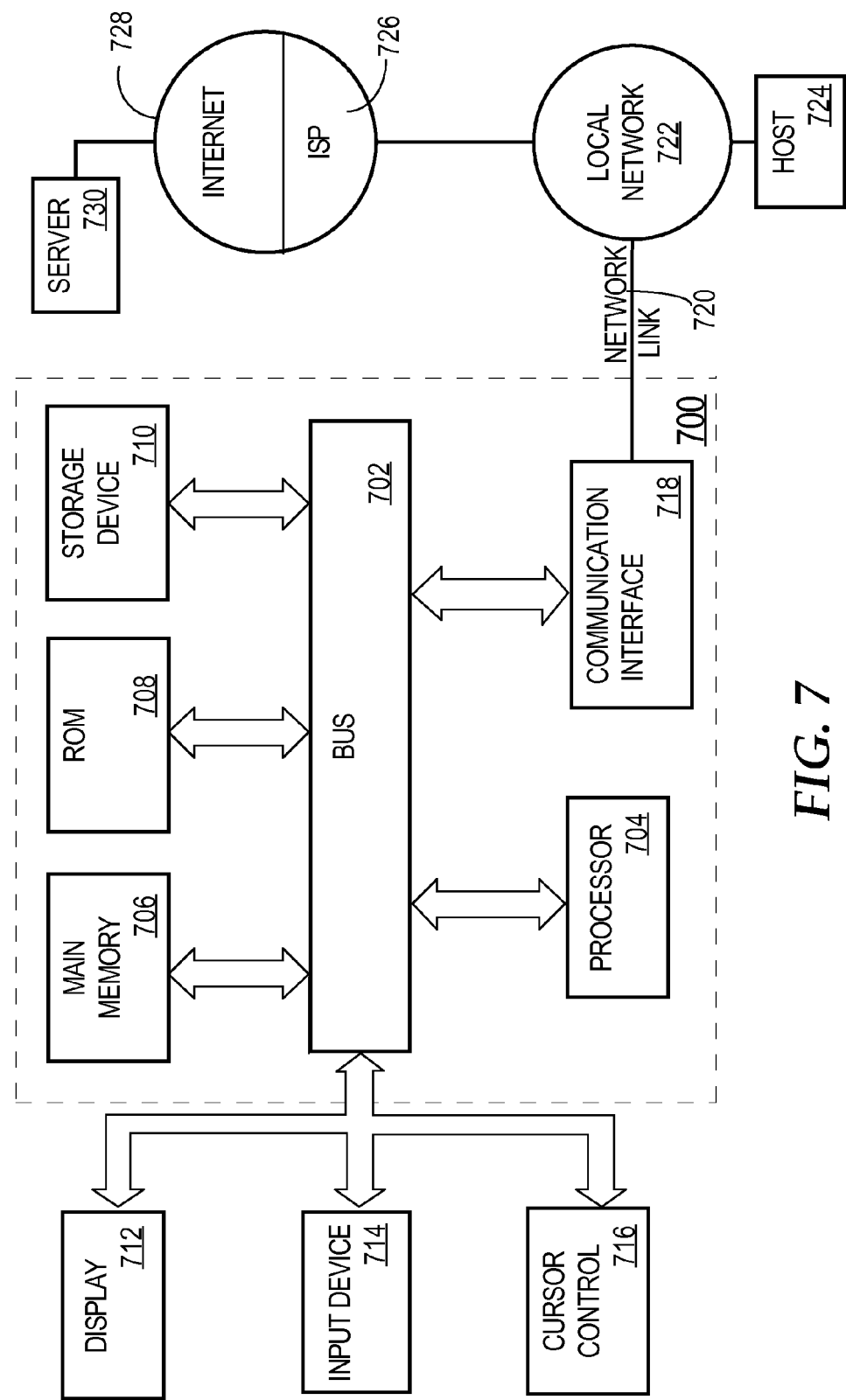
FIG. 7 is a block diagram of a computer system upon which embodiments of the invention may be implemented.

In one embodiment, the selected subset of weighted non-leaf nodes is determined based on a main memory limitation such that the spatial partitioning of the selected nodes may be performed within a limited amount of main memory, such as main memory 706 (FIG. 7). For example, the main memory limitation may correspond to the available memory on one or more systems, an allocated amount of main memory, or any other reasonable memory constraint. A maximum number of selected nodes that may be maintained within the main memory limitation may be determined.

In one embodiment, a depth level of hierarchical spatial index 400 is determined that satisfies a main memory limitation. For example, the fanout factor of hierarchical spatial index 400 may be used to determine that all the non-leaf nodes at a specific depth level, that contains a number of nodes, do not violate the main memory limitation. For example, if the maximum depth level that will satisfy a main memory limitation forced hierarchical spatial index 400 is i, then the set of all level h−i nodes 440 may be selected for partitioning and histogram generation without violating the main memory limitation. If hierarchical spatial index 400 indexes x spatial objects, level h−i contains approximately $x/(\text{fanout factor}*\text{fill factor})^{h-i}$ nodes when the fill factor is represented by a value between 0-1. In one embodiment, the depth level i is determined by traversing hierarchical spatial index 400 to count the number of nodes at a given level to determine the largest depth level i that does not violate the main memory limitation.

In one embodiment, nodes from multiple depth levels of hierarchical spatial index 400 may be selected. For example, in the previous example, node 442, a level h−i node, may be excluded from the selected nodes and replaced with its child nodes 444 from level h−i−1 as long as all the child nodes can be accommodated without violating the main memory limitations.

Weight Approximation

A weight is determined for each selected node in the subset of weighted non-leaf nodes. The weight of a non-leaf node is based on the number of spatial objects contained within the bounding region of the non-leaf node, which is reflected by the number of leaf-nodes in the subtree of the non-leaf node. The weights of the non-leaf nodes are used to generate the spatial histogram after the selected nodes are spatially partitioned. Furthermore, the weights may be used in one or more heuristics used to spatially partition the selected nodes, such as when an equi-count heuristic or other count-based heuristic is used to partition the bounding regions of the selected nodes.

Many methods may be used to obtain or approximate the weight of each selected node. In one embodiment, the weight of a selected node is determined by counting, such as by traversing the subtree of the node in the hierarchical spatial index to generate an exact count.

Alternatively and/or in addition, a prior weight count may be obtained from stored weight data. For example, a spatial indexing component, such as spatial indexing component 327, may store weight data for the non-leaf nodes of the hierarchical spatial index. The stored weight data may be periodically updated, such as based on a regular time period, based on a number of index changes, after each insertion and deletion, or by any other periodic method of updating the stored weight data. In one embodiment, the stored weight data is stored in a separate table. The table may include all non-leaf nodes or a subset thereof, such as non-leaf nodes that fall within a range of depth levels that are expected to be frequently accessed.

Alternatively and/or in addition, a weight count may be estimated. For example, the weight count may be estimated based on a fanout factor, a fill factor, and/or any other parameter of the hierarchical spatial index. A spatial indexing component, such as spatial indexing component 327, may be configured to generate and/or maintain the hierarchical spatial index based on these parameters such that an estimate based on these parameters is improved. Estimating the weights leads to a faster statistics collection process that eliminates the need to traverse the hierarchical spatial index to the leaf level.

Partitioning

The bounding regions represented by the selected nodes are spatially partitioned. Any of a variety of partitioning heuristics may be utilized to divide the space containing the selected nodes. In one embodiment, the partitioning heuristic involves portioning the bounding regions associated with the selected nodes, such as an MBR. Fuzzy partitioning may be used for one or more of the selected nodes. In fuzzy partitioning, a bounding region represented by a particular node is split into two or more weighted subobjects that are assigned to different partitions. The weight of the weighted subobjects may be determined based on the dimensions of the represented bounding region, a midpoint, midpoints of the bounding regions of the subobjects, the original weight of the particular node, and/or any other suitable factor for distributing the weight of the particular node over the different partitions.

For example, a selected node with a bounding region that is not wholly within a particular partition may increase the count of the particular partition by the weight of the selected node, adjusted by a factor that represents the portion of its bounding region that is actually within the particular partition. Thus, a selected node representing a bounding region whose extent is only seventy-five percent within the particular partition would increase the count of the particular partition by 0.75 times the weight of the selected node. Other counting and/or weighting techniques may instead be used.

In embodiments, a recursive partitioning heuristic, or similar, is utilized to determine the boundaries of the partitions. The multidimensional space is recursively subdivided until some threshold condition is reached. An initial bounding region of the multidimensional space (e.g. a bounding region covering all bounding regions represented by the selected nodes) serves as an initial partition. The initial partition is split into a set of two or more new partitions, and the initial partition is discarded. The new partitions are in turn split into sets of two or more new partitions, and then discarded. The splitting process is repeated for each new partition, until a target number of partitions has been identified, or some other threshold condition is met. For instance, the threshold condition may be the creation of a target number of partitions. As another example, the threshold condition may be that each partition overlaps with no more or no less than a threshold weight sum. Other types of threshold conditions may also or instead be used.

Initially, all selected nodes are assigned, for counting purposes, to the initial partition. Whenever a particular partition is split, the spatial objects assigned to the particular partition are re-assigned to the new partitions that were created from the particular partition.

In an embodiment, an equi-count strategy is utilized to identify the extents of each new partition created during each recursion of subdividing the multidimensional space. Each time a particular partition is split, the particular partition is divided into two or more new partitions containing bounding regions with approximately equally-sized subsets of the spatial objects (i.e. sum of weights of the selected nodes).

In an embodiment, an equi-area strategy may instead be utilized to identify the extents of each partition during each iteration of subdividing the multidimensional space. Each time a particular partition is split, the particular partition is divided into two or more new partitions that have approximately equal areas. For example, a two-dimensional space may be divided into two sides of equal areas.

In an embodiment, after objects are assigned to new partitions, as discussed above, the extent of each partition may be expanded or contracted to a bounding region containing all objects assigned to the partition. Depending on the embodiment, the partitions may or may not overlap. Any number of partitions may be created, and any algorithm for identifying the extents of the partitions may be utilized. For example, the multidimensional space may be partitioned into equally sized partitions. More detailed examples of suitable partitioning techniques are described in subsequent sections.

Fuzzy Partitioning of Subobjects

Figure 5:
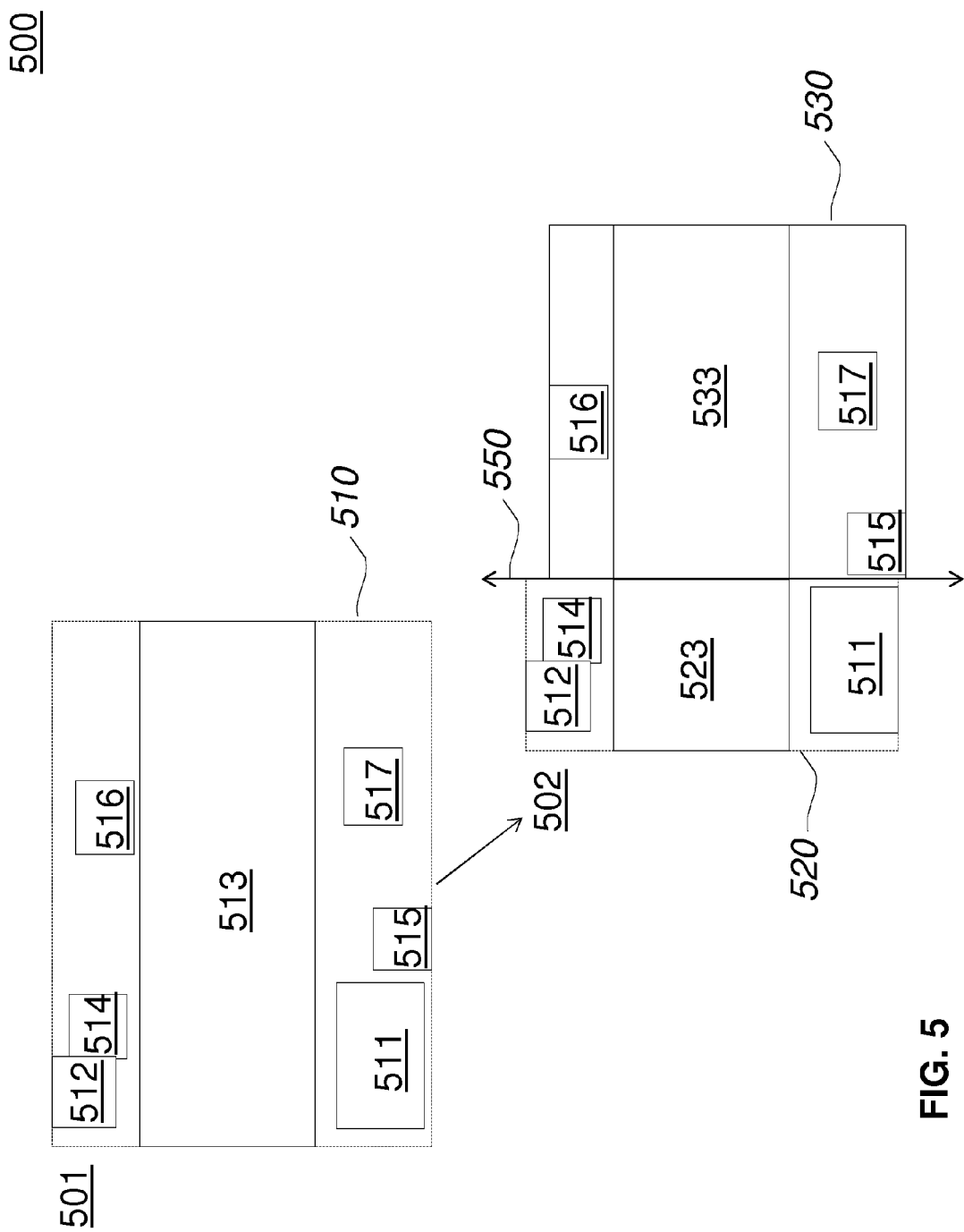
FIG. 5 is a block diagram that illustrates how a partition may be divided into two partitions when a large object has been divided into weighted sub-objects.

FIG. 5 is a block diagram 500 that illustrates how a partition 510 may be divided into two partitions 520 and 530 when a large object 513 has been divided into weighted subobjects 523 and 533. Initial partition 510, as illustrated in block 501, comprises objects 511-517, of which object 513 is significantly large, and in fact fills the entire width of partition 510. The large object 513 may correspond to a bounding region represented by a selected node.

When dividing partition 510, objects 511-517 are evaluated to determine whether any of the objects meet a threshold condition to be considered a large object, such as having bounding regions that are larger than a threshold dimension size. In this case, object 513 meets the threshold condition. Object 513 is thus considered to be a large object and is therefore "splittable" if it overlaps two partitions.

In the illustrated embodiment, the objects in initial partition 510 are divided according to an equi-count heuristic, thus resulting in the dividing line 550 illustrated by block 502. For purposes of determining the location of dividing line 550 under some equi-count heuristics, large objects such as object 513 may have been ignored, depending on whether it was possible to divide partition 510 into approximately equal-count subpartitions without dividing object 513.

As further illustrated by block 502, objects 511, 512, and 514 are assigned to the left side of dividing line 550, while objects 515-517 are assigned to the right side of dividing line 550. Finally, object 513 is split into two weighted subobjects 523 and 533 along dividing line 550. Subobject 523 is assigned to the left side, while subobject 533 is assigned to the right side. Partitions 520 and 530 are then formed by finding bounding regions for all objects (and subobjects) assigned to the left side of dividing line 550 and all objects (and subobjects) assigned to the right side of dividing line 550, respectfully.

In an embodiment, each of objects 511-517 is assigned a weight, which may have been a default value such as 1 if the object had never been split, or a fraction of the default value if the object was a weighted subobject from a previous split. The weight of most of objects 511-517 will remain unchanged as a result of the division. However, the weight assigned to object 513 is divided proportionally amongst subobjects 523 and 533 relative to the size of object 513. A "count" of the objects in each of partitions 510, 520, and 530 is the sum of the weights of the objects in the respective partitions. For example, assuming all objects initially had a weight of 1, and that subobject 523 is 0.3 times the size of object 513, the count of partition 510 would be 7, the count of partition 520 would be 3.3, and the count of partition 530 would be 3.7. Thus, the counts associated with partitions 520 and 530 are based at least partly on the extent to which large objects such as object 513 overlaps partitions 520 and 530.

Partition 510, depending on the embodiment, may or may not be discarded after the division has been accomplished. However, partition 510 will not be divided again.

Block diagram 500 is but one example of how partition 510 may divided. Many other divisions are also possible. For example, dividing line 550 may be placed in different locations with potentially different orientations depending on the exact equi-count or equi-area heuristic used. There may be multiple dividing lines 550, for example, to divide partition 510 into three or more partitions at a time. In embodiments, smaller objects may straddle dividing line 550 and be assigned to one of the sides without being split. In some of these embodiments, object 513 may be split along a partition boundary rather than the dividing line 550, since there may be some overlap in the partitions. Depending on the implementation, subobjects 523 and 533 may or may not possess some overlap in such cases.

Block diagram illustrates an embodiment in a two-dimensional space with bounding regions that are minimum bounding rectangles. However, the depicted techniques are extensible to multidimensional spaces of any size, and any suitable bounding regions may be utilized. Fuzzy partitioning is further detailed in U.S. patent application Ser. No. 13/587,897, filed Aug. 16, 2012, the entire contents of which is hereby incorporated by reference as if fully set forth herein Spatial Histogram A spatial histogram may be generated based on the partitions and the weights of the selected nodes contained therein. The weights of the selected nodes contained therein reflect the number of spatial objects associated with the leaf nodes, e.g. leaf nodes 450 of hierarchical spatial index 400. For example, spatial histogram creation component 326 may save a spatial histogram 336 to database 330. The histogram may be, for example, in the form of a table of rows, each row corresponding to a different partition. Each row may include one or more columns specifying the extent of a partition, along with a column containing a count for the partition. Any other suitable representation of a histogram may also be used. In an embodiment, the spatial histogram may furthermore be saved with a timestamp representing when it was created, so that, for example, query optimizer 324 or spatial histogram creation component 326 may decide when to recalculate the histogram.

In one embodiment, while creating and/or deciding upon a query plan to execute a spatial query, a query optimizer, such as query optimizer 324, uses the histogram to calculate selectivity estimates for the spatial data set. For example, if the spatial data set is represented by a table in which each spatial object is specified by a different row of the table, and the query involves the table, the query optimizer may look for histogram partitions that overlap with an extent specified in the query.

Figure 6:
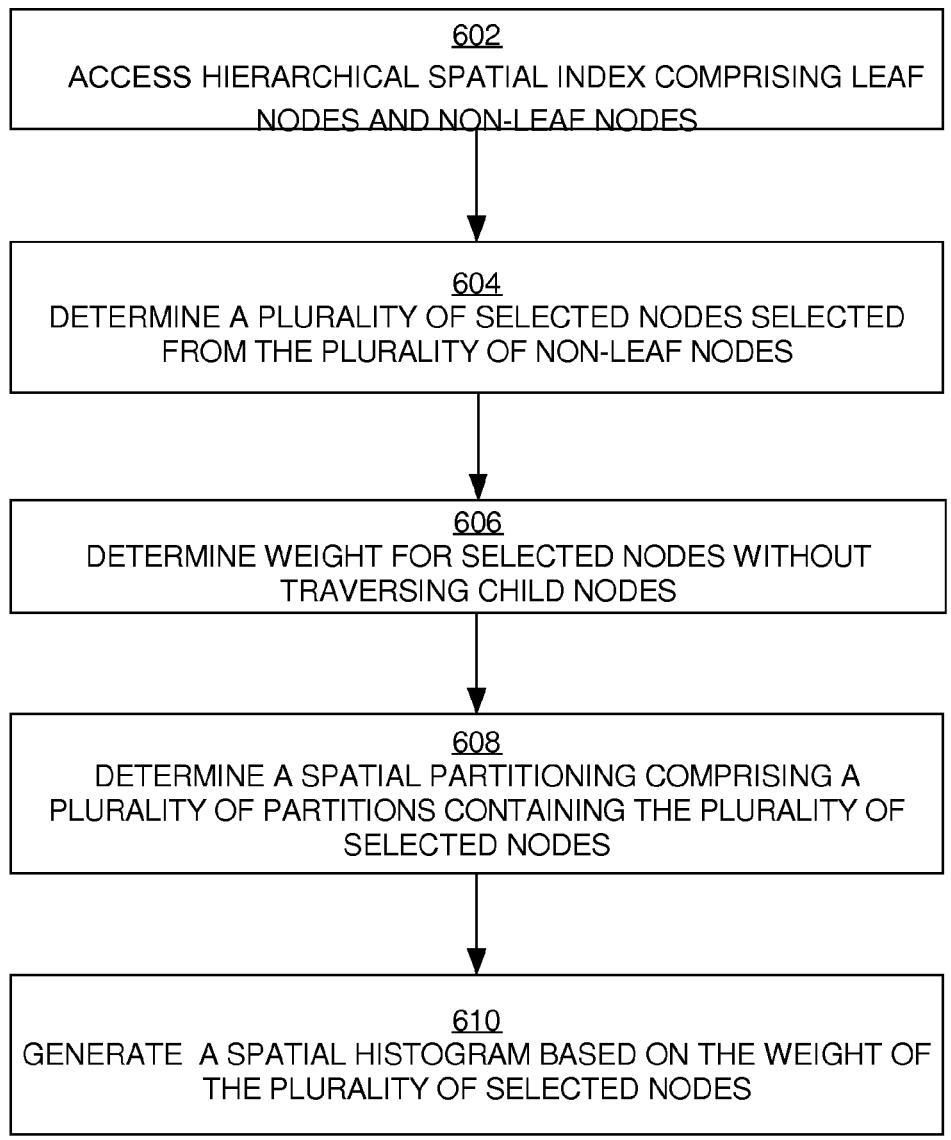
FIG. 6 is a flow diagram that illustrates a technique for constructing a spatial histogram.

FIG. 6 is a flow diagram that illustrates a technique for constructing a spatial histogram, according to an embodiment. In one embodiment, the method is performed by a spatial histogram creation module and/or a query optimizer, such as spatial histogram creation module 326 and query optimizer 324. The method may be performed by a query optimizer to generate an execution plan for a spatial database query.

At block 602, a hierarchical spatial index is accessed. For example, the hierarchical spatial index may be accessed in a spatial database. The hierarchical spatial index comprises a plurality of leaf nodes in a plurality of non-leaf nodes. Each leaf node represents a bounding region containing a spatial object stored in a spatial database. Each non-leaf node represents a bounding region that at least partially contains one or more spatial objects associated with one or more leaf nodes. In the hierarchical spatial index, a child node that descends from a non-leaf node is fully contained within the bounding region of the ancestor non-leaf node. In one embodiment, the hierarchical spatial index is an R-tree.

At block 604, a plurality of selected node is determined. The selected nodes are selected from the plurality of non-leaf nodes. The plurality of selected nodes comprises an ancestor of each leaf node of the plurality of leaf nodes. In one embodiment, the plurality of selected nodes is determined by determining a depth level of the hierarchical spatial index that satisfies a main memory limitation. For example, the main memory limitation may correspond to the available memory on one or more systems, an allocated amount of main memory, or any other reasonable memory constraint. A maximum number of selected nodes that may be partitioned within the main memory limitation may be determined. Nodes at a particular depth may be replaced by their children nodes if the main memory limitation has not been exhausted. In one embodiment, the nodes with the largest MBR at a depth are selected to be replaced by their children nodes. Any other heuristics may be used.

At block 606, a weight is determined for each particular node in the plurality of selected nodes. The weight is based on the number of spatial objects associated with a plurality of leaf node contained in the bounding region of the particular node. The weight may be determined for each particular node by traversing child nodes of the particular node in the hierarchical spatial index. Alternatively, the weight may be determined for each particular node without traversing the subtree of the particular node. The weight of the particular node may be estimated. For example, the weight may be an estimate based on a fanout factor and a fill factor of the hierarchical spatial index. The generation and/or maintenance of the hierarchical spatial index may be configured based on the fanout factor and/or the fill factor. Alternatively and/or in addition, the weight of the particular node may be obtained from stored weight data. For example, the stored weight data may include a generated weight for each non-leaf node of the hierarchical spatial index. The stored weight data may be periodically updated, such as by traversing the hierarchical spatial index, by updating the hierarchical spatial index based on current changes are logged changes, or any other method suitable for updating the stored weight data.

At block 608, a spatial partitioning of the plurality of selected nodes is determined. The spatial partitioning comprises a plurality of partitions that contain the plurality of selected nodes. In one embodiment, at least one of the plurality of selected nodes is divided into two or more weighted subobjects belonging to different partitions.

At block 610, a spatial histogram is generated. The spatial histogram is generated based on the spatial partitioning and the weights of the plurality of selected nodes. At least one statistic may be generated based on the spatial histogram. In one embodiment, the at least one statistic comprises an estimated selectivity value.

Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
accessing a hierarchical spatial index comprising a plurality of leaf nodes and a plurality of non-leaf nodes, each leaf node of the plurality of leaf nodes representing a bounding region containing a spatial object stored in a spatial database, each non-leaf node of the plurality of non-leaf nodes representing a bounding region at least partially containing one or more spatial objects associated with one or more leaf nodes, wherein any child node descending from any of the plurality of non-leaf nodes is at least partially contained within a bounding region of its ancestor non-leaf nodes;
determining a plurality of selected nodes selected from the plurality of non-leaf nodes;
determining a weight for each particular node in the plurality of selected nodes, the weight indicating a number of spatial objects, of the spatial objects stored in the spatial database, that are contained within the bounding region represented by said each particular node;
determining a spatial partitioning of bounding regions represented by the plurality of selected nodes by applying a partitioning procedure to recursively divide a space containing the bounding regions represented by the plurality of selected nodes to determine a plurality of partitions containing the bounding regions represented by the plurality of selected nodes;
generating a spatial histogram based on the spatial partitioning of the bounding regions represented by the plurality of selected nodes and the weights of the plurality of selected nodes; and
outputting, in response to a query, a query result for the spatial database based on the spatial histogram;
wherein the method is performed by one or more computing devices.

2. The method of claim 1, wherein determining the plurality of selected nodes comprises determining a depth level of the hierarchical spatial index that satisfies a main memory limitation.

3. The method of claim 1, wherein the bounding region is a minimum bounding rectangle.

4. The method of claim 1, wherein the hierarchical spatial index is an R-tree.

5. The method of claim 1, wherein determining the weight for said each particular node comprises estimating at least one weight for at least one node based on a fanout factor and a fill factor of the hierarchical spatial index.

6. The method of claim 1, wherein determining the weight for said each particular node comprises obtaining stored weight data generated for the plurality of non-leaf nodes of the hierarchical spatial index.

7. The method of claim 1, further comprising generating an estimated selectivity value based on the spatial histogram.

8. The method of claim 1, wherein the partitioning procedure optimizes for even weight distribution over the plurality of partitions.

9. The method of claim 1, wherein the partitioning procedure comprises splitting a particular bounding region represented by a node of the plurality of selected nodes into two or more weighted subobjects belonging to different partitions created by the partitioning procedure, wherein the two or more weighted subobjects are assigned weights based on the weight of the node.

10. The method of claim 1, wherein the plurality of selected nodes comprises an ancestor of each leaf node of the plurality of leaf nodes.

11. One or more non-transitory computer-readable media carrying one or more sequences of instructions that, when executed by one or more processors, cause the one or more processors to carry out:
accessing a hierarchical spatial index comprising a plurality of leaf nodes and a plurality of non-leaf nodes, each leaf node of the plurality of leaf nodes representing a bounding region containing a spatial object stored in a spatial database, each non-leaf node of the plurality of non-leaf nodes representing a bounding region at least partially containing one or more spatial objects associated with one or more leaf nodes, wherein any child node descending from any of the plurality of non-leaf nodes is at least partially contained within a bounding region of its ancestor non-leaf nodes;
determining a plurality of selected nodes selected from the plurality of non-leaf nodes;
determining a weight for each particular node in the plurality of selected nodes, the weight indicating a number of spatial objects, of the spatial objects stored in the spatial database, that are contained within the bounding region represented by said each particular node;
determining a spatial partitioning of bounding regions represented by the plurality of selected nodes by applying a partitioning procedure to recursively divide a space containing the bounding regions represented by the plurality of selected nodes to determine a plurality of partitions containing the bounding regions represented by the plurality of selected nodes;

generating a spatial histogram based on the spatial partitioning of the bounding regions represented by the plurality of selected nodes and the weights of the plurality of selected nodes; and outputting, in response to a query, a query result for the spatial database based on the spatial histogram.

12. The one or more non-transitory computer-readable media of claim 11, wherein determining the plurality of selected nodes comprises determining a depth level of the hierarchical spatial index that satisfies a main memory limitation.

13. The one or more non-transitory computer-readable media of claim 11, wherein the bounding region is a minimum bounding rectangle.

14. The one or more non-transitory computer-readable media of claim 11, wherein the hierarchical spatial index is an R-tree.

15. The one or more non-transitory computer-readable media of claim 11, wherein determining the weight for said each particular node comprises estimating at least one weight for at least one node based on a fanout factor and a fill factor of the hierarchical spatial index.

16. The one or more non-transitory computer-readable media of claim 11, wherein determining the weight for said each particular node comprises obtaining stored weight data generated for the plurality of non-leaf nodes of the hierarchical spatial index.

17. The one or more non-transitory computer-readable media of claim 11, wherein the one or more sequences of instructions include instructions that, when executed by the one or more processors, cause the one or more processors to carry out generating an estimated selectivity value based on the spatial histogram.

18. The one or more non-transitory computer-readable media of claim 11, wherein the partitioning procedure optimizes for even weight distribution over the plurality of partitions.

19. The one or more non-transitory computer-readable media of claim 11, wherein the partitioning procedure comprises splitting a particular bounding region represented by a node of the plurality of selected nodes into two or more weighted subobjects belonging to different partitions created by the partitioning procedure, wherein the two or more weighted subobjects are assigned weights based on the weight of the node.

20. The one or more non-transitory computer-readable media of claim 11, wherein the plurality of selected nodes comprises an ancestor of each leaf node of the plurality of leaf nodes.

* * * * *